UNITED STATES PATENT OFFICE.

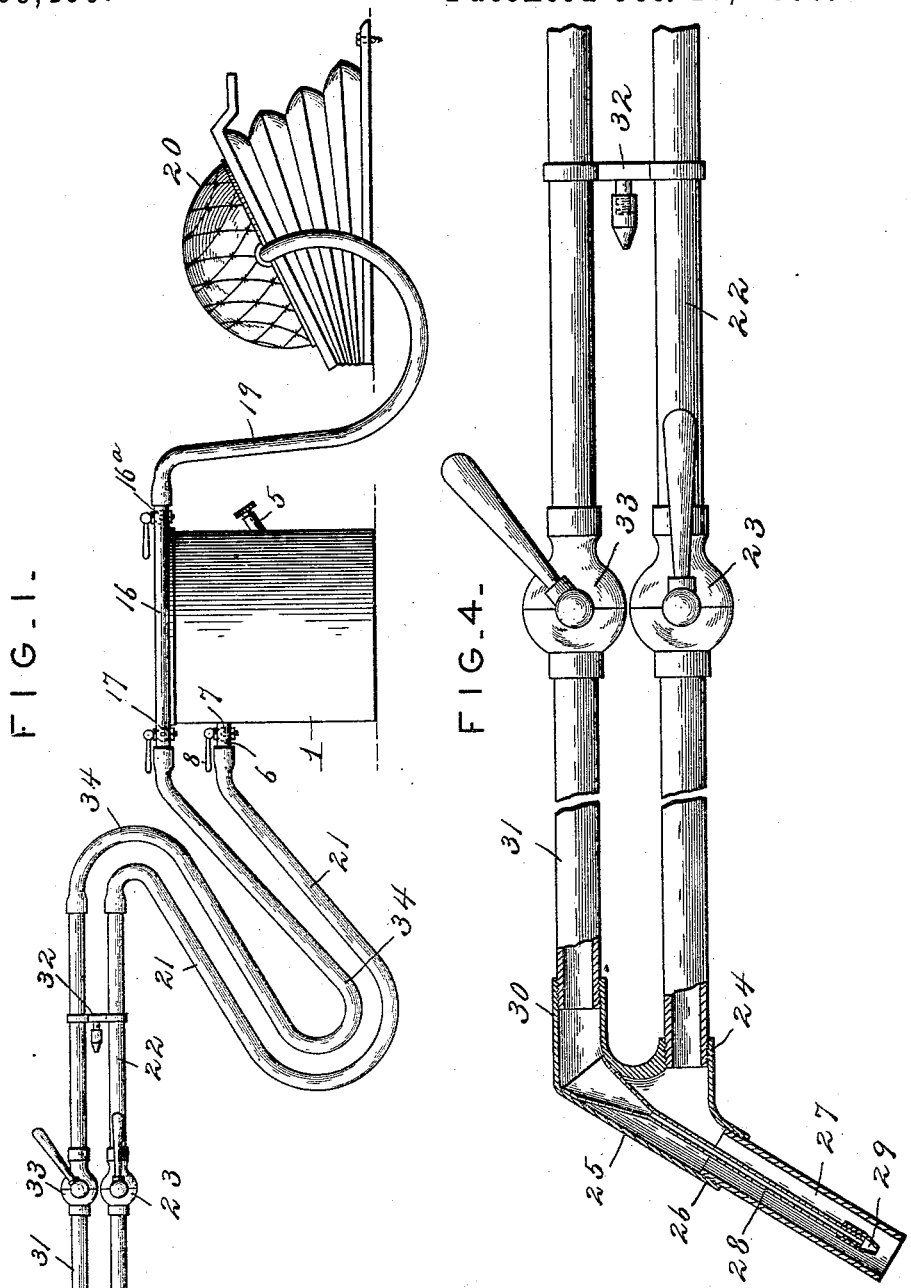

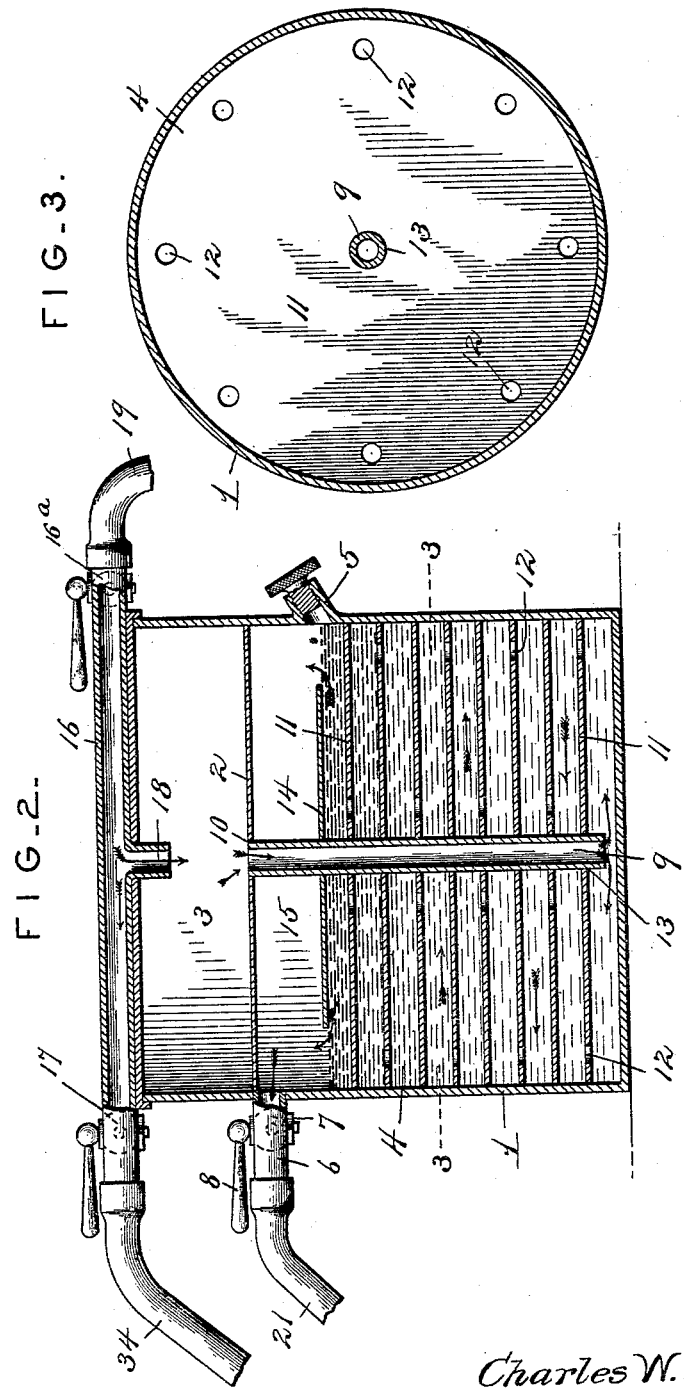

CHARLES W. INGRAHAM, OF HEPPNER, OREGON, ASSIGNOR OF ONE-HALF TO HARRY WARREN, OF SAME PLACE.

CARBURETER.

SPECIFICATION forming part of Letters Patent No. 569,460, dated October 13, 1896.

Application filed December 27, 1895. Serial No. 573,443. (No model.)

*To all whom it may concern:*

Be it known that I, CHARLES W. INGRAHAM, a citizen of the United States, residing at Heppner, in the county of Morrow and State of Oregon, have invented a new and useful Carbureter, of which the following is a specification.

This invention relates to gas-generating apparatus; and it has for its object to provide a new and useful apparatus of this character having simple and efficient means for producing hydrocarbon gas or vapor in sufficient quantities, and so combining the same with air to produce an intense flame especially useful in metallurgical operations for brazing, soldering, and the like.

With these and other objects in view, which will readily appear as the nature of the invention is better understood, the same consists in the novel construction, combination, and arrangement of parts hereinafter more fully described, illustrated, and claimed.

In the drawings, Figure 1 is a side elevation of a complete gas generating and burning apparatus constructed in accordance with this invention. Fig. 2 is an enlarged central vertical sectional view of the generator. Fig. 3 is a horizontal sectional view on the line 3 3 of Fig. 2. Fig. 4 is an enlarged detail sectional view of the blowpipe device used in connection with the generator.

Referring to the accompanying drawings, the numeral 1 designates an oil-tank of a suitable size, according to the desired capacity of the apparatus, said tank having fitted within the upper end thereof a horizontal partition 2, which separates the interior of the tank into an upper air-chamber 3 and a lower oil-chamber 4, which is adapted to be kept nearly filled with oil that is introduced into the tank through the plugged filling-tube 5, projected from one side of the tank. The tank 1 is further provided at one side thereof directly below the partition-plate 2 with an offstanding gas-outlet pipe 6, provided with a stop-cock 7, having a handle 8, which provides convenient means for controlling or cutting off the flow of gas through the pipe 6, and depending within the oil-tank is a central air-circulating tube 9.

The central air-circulating tube 9 is fitted centrally at its upper end, as at 10, to the center of the partition-plate 2 and communicates with the upper air-chamber 3 of the tank, and the lower end of the tube 9 projects to a point in close proximity to the bottom of the tank 1 to provide for directing the air-currents directly into the oil at the bottom of the tank. Fitted on the tube 9, and within the tank 1, is a series of parallel diaphragms 11, each of which diaphragms is provided with a circular series of air openings or perforations 12, which provide for the ready upward escape of the air forced into the oil through the central circulating-tube 9.

The diaphragms 11 are of a diameter agreeing with the interior diameter of the tank 1, so as to snugly fit within the same, and are centrally perforated, as at 13, to snugly receive the circulating-tube 9, and it will be observed that certain of said diaphragms have the air openings or perforations 12 thereof disposed near the central tube 9, while the other diaphragms alternating therewith have their air openings or perforations 12 disposed near to the sides of the tank, whereby the air openings or perforations of the directly adjacent diaphragms will be out of alinement to provide a circuitous or zigzag passage for the air, compelling the same to pass in a horizontal direction through the oil between the several diaphragms before it can find its escape in an upward direction.

The uppermost of the diaphragms 11 is disposed within the tank 1 directly below the plane of the filling-tube 5, so that all of said diaphragms will be submerged in the oil, and directly above said uppermost diaphragms is arranged a horizontal deflecting-plate 14, fitted at its center on the tube 9 and of a smaller diameter than the diaphragms. The horizontal deflecting-plate 14 serves to deflect the air which passes through the air openings or perforations in the uppermost diaphragm in an outward direction toward the sides of the tank, where it escapes around the edges of the plate 14 into the gas chamber or space 15, confined between the plates 2 and 14, and from which gas chamber or space leads the gas-outlet pipe 6.

Arranged on top of the tank 1 is an air-distributing tube 16, provided at one end with an air-supply stop-cock 16ª, at its opposite end with an air-regulating stop-cock 17, and at a central point with a depending discharge-neck 18. The depending discharge-neck 18 of the distributing-tube 16 projects within the air-chamber 3 of the tank 1 above the upper end of the tube 9 and provides means for filling said air-chamber with air, so that the requisite quantity thereof can be circulated under pressure through the tube 9 and into the oil of the tank. At its end opposite the valve 17 the tube 16 has fitted thereto one end of the flexible air-supply tube 19, the other end of which is suitably connected with an ordinary air bellows or pump 20, which provides means for forcing air under pressure into and through the oil-tank, as will be readily understood.

The valved gas-outlet pipe 6 of the generator has fitted thereto one end of a flexible gas-conducting tube 21, the other end of which is fitted to one end of the gas-supply pipe 22 of a blowpipe device. The gas-supply pipe 22 of the blowpipe device is provided at a point intermediate of its ends with a gas-controlling valve 23, and at its end opposite its connection with the tube 21 the said pipe 22 is fitted into the side gas-inlet neck 24 of the blowpipe head or casting 25.

The blowpipe head or casting 25 is provided with a tube-neck 26, disposed at an angle to the neck 24, and into which is fitted one end of a cylindrical burner-tube 27, the other end or mouth of which provides an igniting-point for the gas directed into the burner-tube through the blowpipe-head and the gas-pipe connected therewith. The said blowpipe head or casting 25 has suitably fitted therein a small air-jet tube 28, which projects centrally into the burner-tube 27, and is provided at its outer end within said burner-tube with a detachable tapered jet-nipple 29, which jets a stream of air centrally into the flame of burning gas at the outer end or mouth of the burner-tube 27.

The small air-jet tube 28, within the burner-tube and the blow-pipe head 25, is provided with a flared inner end communicating with the offstanding air-inlet neck 30, projected from one side of the head 25, and having fitted therein one end of an air-supply pipe 31. The air-supply pipe 31 is preferably arranged parallel with the pipe 22 and is coupled therewith by means of a suitable coupling 32, and at a point intermediate of its ends the pipe 31 is provided with an air-controlling valve 33, similar to the valve 23 in the pipe 22. At its end opposite the connection with the blowpipe-head 25 the air-supply pipe 31 has connected thereto one end of a flexible air-conducting tube 34, the outer end of which tube is fitted to the valved end of the air-distributing pipe 16 on top of the tank 1.

In operation, the air-bellows or air-pump 20 is manipulated so as to force air under pressure into the oil-tank and circuitously through the oil therein by the means hereinbefore described. The air as it is forced through the hydrocarbon oil in the tank becomes carbureted or laden with the oil-vapor and passes from the gas chamber or space 15, within the tank, into the gas-conducting tube 21 and the gas-supply pipe 22 of the blowpipe device. Any regulated quantity of the gas is admitted into the blowpipe-head 25, and, passing through the burner-tube 27, is ignited at the outer end of such tube, which may be directed toward any object for brazing, soldering, or other purposes. The air which is forced through the distributing-tube 16 not only passes through the neck 18 into the air-chamber 3, but also passes through the tube 34 and the pipe 31. From the pipe 31 a regulated supply of air passes into the air-jet tube 28, which directs a jet of air through the center of the ignited gas and produces an oxygenated flame having an intense heat especially desirable for metallurgical purposes. It will therefore be seen that the burner-tube 27 and the connections therewith form a device securing the same result as an ordinary blowpipe.

From the foregoing it is thought that the construction, operation, and many advantages of the herein-described gas-generating apparatus will be readily apparent to those skilled in the art, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

In a gas-generating apparatus, an upright oil-tank provided above its horizontal center with a horizontal partition-plate between which and the top of the tank is confined an upper air-chamber, and below which partition-plate is confined a lower oil-chamber, said tank also having at one side directly below the partition-plate an offstanding valved gas-outlet pipe, a central air-tube depending from the partition-plate to a point in close proximity to the bottom of the tank, a series of parallel diaphragms fitted within the tank around the central air-tube and provided with a series of oil openings or perforations out of vertical alinement, a horizontal deflecting-plate fitted on the central air-tube between the uppermost diaphragm and the side gas-outlet pipe, a straight air-distributing tube arranged flat on top of the lid of the tank and provided with valved extremities and at an intermediate point with a central discharge-neck projected through an opening in the lid of the tank, a blowpipe device having pipe connections respectively with the gas-outlet pipe and one of the valved ends of the air-distributing tube, and an air-supply tube connected with the other valved end of said distributing-tube, substantially as set forth.

In testimony that I claim the foregoing as my own I have hereto affixed my signature in the presence of two witnesses.

CHARLES W. INGRAHAM.

Witnesses:
P. B. McSwords,
E. S. Keithly.